United States Patent
Thaler

[15] 3,691,183
[45] Sept. 12, 1972

[54] 3,5-SUBSTITUTED-1,2,4 THIADIAZOLES
[72] Inventor: Warren A. Thaler, Matawan, N.J. 07747
[73] Assignee: Esso Research and Engineering Company
[22] Filed: May 12, 1970
[21] Appl. No.: 36,685

[52] U.S. Cl...............260/302 SD, 252/402, 424/270
[51] Int. Cl................................C07d 91/60
[58] Field of Search.................260/302 SD
[56] References Cited

OTHER PUBLICATIONS
Goerdeler et al.; Chem. Abstracts, 63:2965–6 (1965)

Primary Examiner—Alex Mazel
Assistant Examiner—R. J. Gallagher
Attorney—Chasan and Sinnock and Michael Conner

[57] ABSTRACT

3-Halo-1,2,4 thiadiazole-5 sulfenyl halides are produced by reacting cyanodithioimidocarbonate anion with the corresponding halogen. 3-Halo-1,2,4 thiadiazole-5 sulfenyl halides are useful as pesticides and chemical intermediates. Derivatives of the 3-halo-1,2,4 thiadiazole-5 sulfenyl halides include the di(3-halo-1,2,4 thiadiazol-5-yl) disulfides, and are useful as pesticides, antioxidants, and U.V. stabilizers.

17 Claims, No Drawings

3,5-SUBSTITUTED-1,2,4 THIADIAZOLES

BACKGROUND OF THE INVENTION

1. Field of the Invention

This invention relates to new organic compounds, methods of preparation, and use of such compounds as chemical intermediates in an improved process for producing other novel compounds that have desirable properties.

The new compounds may be described generally as 3-halo-1,2,4 thiadiazole-5 sulfenyl halides and the corresponding disulfides. The 3-halo-1,2,4 thiadiazole-5-sulfenyl halides may be more precisely defined by the general formula set forth below:

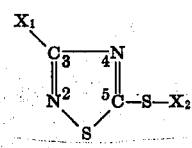

wherein $X_1$ and $X_2$ are independently selected from the halogen group, preferably Br and Cl, and $X_2$ is most preferably Cl. Specific compounds within this definition include 3-chloro-1,2,4 thiadiazole-5 sulfenyl chloride and 3-bromo-1,2,4 thiadiazole-5 sulfenyl chloride. These compounds can be further reacted with olefins or other functionally substituted unsaturated molecules to give novel 5-(halo hydrocarbyl thio)-3-halo-1,2,4 thiadiazoles. The sulfenyl halides can also be reduced to give novel disulfides having the general formula:

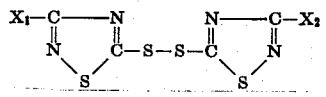

wherein $X_1$ and $X_2$ are independently selected from the halogen group (preferably Br and Cl), and the disulfides can be chlorinated to give the corresponding sulfenyl chlorides.

An illustration of the latter reaction is as follows:

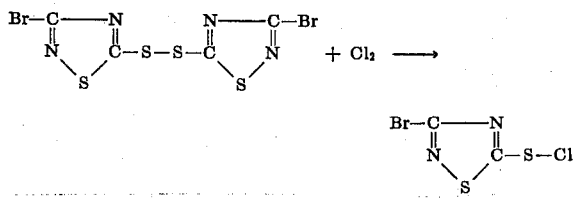

It should be noted that certain of the above novel disulfides can be prepared directly by halogenating the cyanodithioimidocarbonate anion with either $Br_2$ or BrCl. The resultant products are the di(3-bromo-1,2,4 thiadiazol-5-yl) disulfide and the 3-bromo-3'-chloro-1,2,4 thiadiazol-5-yl disulfide, respectively.

The above compounds are useful for pest control and can be used to arrest infestations of insects and other pestiferous organisms, such as fungi, bacteria, protozoa, and molds, which are harmful to man.

2. Description of the Prior Art

The use of 1,2,4 thiadiazoles as nematocides, pesticides, herbicides, defoliants, etc. is well known in the art. For example, see U.S. Pat. No. 3,090,721, which discloses the use of 1,2,4 thiadiazoles with a halogen attached in the 3 position, and a phenyl or a sulfide group attached in the 5 position as a nematocide.

In U.S. Pats. Nos. 3,260,725 and 3,159,644 the effectiveness of various 3,5-substituted-1,2,4 thiadiazole derivatives as fungicides, nematocides, etc. are disclosed.

The use of 1,2,4 thiadiazoles as antioxidants and corrosion inhibitors is disclosed in U.S. Pats. Nos. 2,719,125 and 2,719,126. U.S. Pat. No. 3,058,990 discloses various 1,2,4 thiadiazoles for compounding with mineral oil lubricants to increase the load-carrying capacity.

The above-mentioned substituted-1,2,4 thiadiazoles are prepared by one of two methods: condensing the desired substituent with a thiadiazole to give substituted thiadiazoles, and condensing a substituted isothiouronium halide with perchloro methyl mercaptan to give substituted thiadiazoles. Both of these processes are economically unattractive.

In general, this invention provides an inexpensive alternate to the above-mentioned methods of preparation of substituted thiadiazoles, especially the novel 3-halo-1,2,4 thiadiazole-5 sulfenyl halides disclosed above. Furthermore, this invention discloses a method for preparing novel substituted thiadiazoles based on further reactions of these novel 3-halo-1,2,4 thiadiazole-5 sulfenyl halides.

SUMMARY OF THE INVENTION

It has been unexpectedly found according to this invention that contacting cyanodithioimidocarbonate anion with halogen under reaction conditions results in the formation of 3-halo-1,2,4 thiadiazole-5 sulfenyl halide. This reaction occurs according to the following general formula:

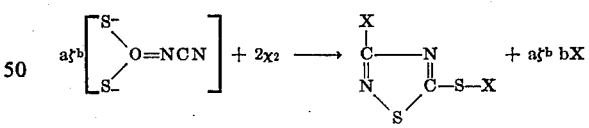

wherein $a$ equals the number of moles of neutralizing cation required to form the salt of cyanodithioimidocarbonate and is usually equal to 1 or 2; $b$ equals the valence of the neutralizing cation, and also corresponds to the number of moles of halogen per mole of salt reaction product, preferably 1 or 2; $\chi$ equals halogen, usually Cl or Br, with Cl most preferred, ($X_2$ will thus usually relate to $Br_2$ or $Cl_2$, but also includes BrCl, ICl and other like halogenating compounds. In general, any compound which provides a source of positive halogen, such as sulfuryl and thionyl chloride and others known in the art, is within the scope of this invention, although $Br_2$ and $Cl_2$ are preferred, and Cl₂ most preferred); ζ equals any neutralizing cation, most commonly chosen from Groups Ia, IIa and IIIa of the Periodic Table, and usually Na, K, Li, Ca or Mg, with Na and K preferred, and K most preferred.

The cyanodithioimidocarbonate is easily synthesized from cyanamide and carbon disulfide by the addition of a base to a solution of the above in absolute alcohol.

Chlorine reacts directly with the dipotassium salt of cyanodithioimidocarbonate to give 3-chloro-1,2,4 thiadiazol5-yl sulfenyl chloride. Bromine, however, reacts with dipotassium cyanodithioimidocarbonate to give di(3-bromo-1,2,4 thiadiazol-5-yl) disulfide, which can be further reacted with chlorine to give 3-bromo-1,2,4 thiadiazol-5-yl sulfenyl chloride. BrCl can also be reacted with dipotassium cyanodithioimidocarbonate. The resulting product is 3-bromo-3'-chloro-1,2,4 thiadiazol-5-yl disulfide. This product may also be reacted with chlorine to give a mixture of 3-bromo and 3-chloro-1,2,4 thiadiazol-5-yl sulfenyl chloride.

The above reactions are preferably run with the cyanodithioimidocarbonate salt dissolved or slurried in a solvent. The preferential solvents are those that are capable of dissolving some amount of the cyanodithioimidocarbonate and yet are substantially inert to the halogenating compound.

Solvents that can be used include hydrocarbyl ethers, wherein the hydrocarbyl groups are independently selected from the group consisting of $C_1$ to $C_{20}$ alkyl, $C_6$ to $C_{20}$ aryl, $C_3$ to $C_{20}$ cycloalkyl, and $C_7$ to $C_{20}$ aralkyl radicals. Preferably the hydrocarbyl groups are selected from $C_1$ to $C_{10}$ alkyl and $C_6$ to $C_{10}$ aralkyl radicals, with $C_1$ to $C_5$ alkyl radicals most preferred. Also, the oxygen atom of the ether may form part of a cyclic ring. Specific ethers that can be used in the practice of this invention include dimethyl ether, diethyl ether, methyl ethyl ether, dibutyl ether, methyl butyl ether, and tetrahydrofuran.

Chlorinated solvents, including $C_1$ to $C_{10}$ alkyl, $C_3$ to $C_{10}$ cycloalkyl, $C_6$ to $C_{10}$ aryl, and $C_7$ to $C_{10}$ aralkyl chlorides are useful in the practice of this invention. The $C_1$ to $C_6$ chlorinated alkyls are preferred; with $C_1$ and $C_2$ chlorinated alkyls especially preferred. The chlorinated solvent can be a mono or poly chloride, within the limitations stated previously, and furthermore the solvent must be a liquid at the temperature of the reaction. Specific chlorinated compounds, within the scope of the above description, include methyl chloride, methylene chloride, chloroform, carbon tetrachloride, ethyl chloride, dichloroethane, isopropyl chloride and chloro benzene.

The halogen is usually added continuously to the cyanodithioimidocarbonate solvent blend with agitation. The reaction is exothermic, thus the halogen is added slowly to control the temperature rise. The temperature of the reaction can vary from $-100°$ to $+100°$ C, with a preferable range of $-50°$ to $+50°C$, and $-50°$ to $0°C$ most preferred. The reaction can be run under subatmospheric or superatmospheric pressure, but usually ambient pressure conditions are obtained.

The above reactions are usually run in the liquid phase with halogen cyanodithioimidocarbonate contact times ranging from 0.5min. to 20 hrs. with 1–30 min. preferred. The reaction usually occurs instantaneously, but it is possible that reactants and reaction conditions will be such as to require greater contact times. The reaction product is usually separated from the reaction mixture by removing the inorganic salt and distilling off the solvent under reduced pressure. The optimum reaction conditions will, of course, depend on the nature of the reactants and will be apparent to anyone skilled in the art.

The above-mentioned 3-halo-1,2,4 thiadiazol-5-yl sulfenyl halides can be further reacted to give other novel products, which also show utility as pesticides, antioxidants, anticorrosion additives, U.V. stabilizers, and additives for increasing the load-carrying capacity of mineral oil lubricants.

The 3-halo-1,2,4 thiadiazol-5-yl sulfenyl halides can be reacted with olefins to give 5-(halo hydrocarbyl thio)-3-halo-1,2,4 thiadiazoles. This reaction is illustrated by the following general formula:

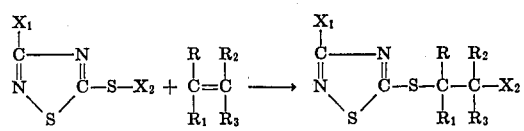

wherein $X_1$ and $X_2$ are independently selected from the halogen group, preferably Cl, or Br, and most preferably Cl.

R, $R_1$, $R_2$ and $R_3$ are hydrocarbon radicals independently selected from the group consisting of hydrogen, alkyl, alkenyl, aryl, aralkyl, and cycloalkyl. Preferably R, $R_1$, $R_2$ and $R_3$ are selected from the group consisting of $C_1$ to $C_{20}$ alkyl, $C_2$-$C_{20}$ alkenyl, $C_6$ to $C_{20}$ aryl, $C_7$ to $C_{20}$ aralkyl and $C_3$ to $C_{20}$ cycloalkyl. Most preferably, R, $R_1$, $R_2$ and $R_3$ are chosen from the group consisting of hydrogen, $C_1$ to $C_4$ alkyl and $C_1$ to $C_4$ alkenyl. The hydrocarbon group may be substituted, provided the substituents do not substantially interfere with the reaction. Substituents will be apparent to those skilled in the art and include O, N, S and halogen-containing groups. Specific olefins which are useful as reactants in this process include ethylene, propylene, isobutylene, cis-butene-2, trans-butene-2, 3,3-dimethylbutene-1, butadiene, and 2-methylbutene-2, 4-chlorobutene-1, 3-methyl-4-aminobutene-1, 2-propenyl, ethyl ether, 3-mercaptopropene-1, and allyl chloride.

The resulting products are also novel and include:
5-(2-chloroethylthio) 3-chloro-1,2,4 thiadiazole
5-(2-chloroethylthio) 3-bromo-1,2,4 thiadiazole
5-(2-chloropropylthio) 3-bromo-1,2,4 thiadiazole
5-(2-chloropropylthio) 3-chloro-1,2,4 thiadiazole
5-(2-chloro-2-methylpropylthio) 3-chloro-1,2,4 thiadiazole
5-(2-chloro-2-methylpropylthio) 3-bromo-1,2,4 thiadiazole
5-(1-methyl-2-chloropropylthio) 3-bromo-1,2,4 thiadiazole
5-(1-methyl-2-chloropropylthio) 3-chloro-1,2,4 thiadiazole
5-(1-methylchloro-3,3 dimethylpropylthio) 3-chloro-1,2,4 thiadiazole
5-(1-methylchloro-3,3 dimethylpropylthio) 3-bromo-1,2,4 thiadiazole 5-(4-butenylthio) 3-bromo-1,2,4 thiadiazole
5-(4-butenylthio) 3-chloro-1,2,4 thiadiazole and related isomers.

It should be noted the $X_1$ may also be S—Cl or S—Br which would then allow the addition of the olefin at the 3-substituted as well as the 5-substituted site of the thiadiazole ring. The resulting products would then be 3,5-di(halohydrocarbyl thio)-1,2,4 thiadiazoles.

The 3-halo-1,2,4 thiadiazol-5-yl sulfenyl halideolefin adduct may be prepared by dissolving the thiadiazole in a suitable solvent such as $CH_2Cl_2$, and adding the olefin to the solution. In a typical experiment 0.1 mole of 3-halo-1,2,4 thiadiazol-5-yl sulfenyl chloride is dissolved in 200 ml $CH_2Cl_2$, 0.1 gram $CaCO_3$ added, and the mixture cooled to $-50°C$. 0.1 mole of olefin is slowly added at a rate such that the solution temperature remains below $-20°C$. After the addition is completed the product is separated by distillation. This reaction is subject to the same process limitations as the halogencyanodithioimidocarbonate reactions.

The 5-(halo hydrocarbyl thio)-3-halo-1,2,4 thiadiazoles may be further reacted with thiophosphate salts to give further novel products. For example, the reaction product of 5-(2-chloroethylthio)-3-chloro-1,2,4 thiadiazole and the ammonium salt of diethyl dithiophosphate is a novel compound which has demonstrated utility as a soil fungicide.

The 3-chloro-1,2,4thiadiazol-5sulfenyl halide may be converted to di(3-chloro-1,2,4 thiadiazol-5-yl)-disulfide, by contacting with $Cu_2Cl_2$ in tetrahydrofuran at room temperature. The disulfide form is also useful as a pesticide, an antioxidant, a vulcanizing aid and a lubricating oil additive.

The above reactions can be run in reactors known in the art. Since each reaction involves potentially corrosive chemical intermediates, glass and corrosion-resistant metals are preferred. Other limitations on reactor construction include the temperature and pressure ranges of the desired reactions. Subject to the above limitations, reactor construction will be apparent to those skilled in the art.

DESCRIPTION OF PREFERRED EMBODIMENTS

Example 1—Preparation of 3-Chloro-1,2,4 Thiadiazol-5-yl Sulfenyl Chloride

To a stirred solution of 100 g (2.38 mole) of cyanamide dissolved in 250 ml of absolute alcohol was added 199 g (2.62 mole) carbon disulfide. The mixture was placed in a round bottom Pyrex flask fitted with an automatic stirrer and maintained below 20°C while a solution of 314 g of 85 percent potassium hydroxide in 600 ml of absolute alcohol was added over a period of 30 min. The mixture was stirred for an additional 45 min. and then suction filtered, washed with tetrahydrofuran and dried in a vacuum oven at 50°C yielding 416 g (90 percent yield based on cyanamide) of dipotassium cyanodi-thioimidocarbonate. A slurry of 103 g (0.53 mole) of potassium cyanodithioimidocarbonate in 750 ml methylene chloride was placed in a round bottom flask equipped with an automatic stirrer and a chlorine inlet tube and cooled to $-40°C$. 75.3 g (1.06 mole) of chlorine was slowly added to the stirred mixture. The reaction mixture was then mechanically stirred at 0°C for 1 hour, suction filtered under dry nitrogen, and the methylene chloride evaporated under reduced pressure yielding 85 g (86 percent yield) of a yellow solid. The reaction product gave the following elemental analysis:

Calculated for $C_2S_2N_2Cl_2$: C, 12.84; N, 14.98; Cl, 37.90, Found: C, 12.86; N, 15.63; Cl, 37.69. Infrared and ultraviolet spectral studies also confirm that 3-chloro-1,2,4 thiadiazol-5-yl sulfenyl chloride was formed.

Example 2—Preparation of Di(3-Chloro-1,2,4 Thiadiazol-5-yl) Disulfide

A solution of 9.35 g (0.05 mole) of 3-chloro-1,2,4 thiadiazol-5-yl sulfenyl chloride in 100 ml dry tetrahydrofuran was stirred with 4.9 g (0.025 mole) $Cu_2Cl_2$ for one hour at room temperature, during which time the green cuprous chloride changed to the brown cupric chloride. The solid was filtered off, the solution evaporated, redissolved in methylene chloride and filtered again. Evaporation of the methylene chloride yielded 7.6 g (100 percent yield) of the disulfide product which was recrystallized from $CH_2Cl_2$-methanol giving 5.0 g of a pale yellow solid, with a melting point of 118°–120°C. The reaction product gave the following elemental analysis:

Calculated for $C_4N_4S_4Cl_2$: C, 15.84; N, 18.48; S, 42.30. Found: C, 15.47; N, 18.46; S, 41.90.

The infrared spectrum $CCl_4$ was very similar to that of the corresponding sulfenyl chloride reactant.

Example 3—Preparation of Di(3-Bromo-1,2,4 Thiadiazol-5-yl) Disulfide

A slurry of 9.7 g (0.05 mole) of dipotassium cyanodithioimidocarbonate in 75 ml $CH_2Cl_2$ was stirred in a round bottom Pyrex flask at $-40°C$ while 16 g (0.1 mole) of $Br_2$ was added dropwise. The mixture was then stirred at 10°C for an additional 2 hours, after which excess bromine and some solvent were removed at reduced pressure. The solid was filtered and the solvent was removed in vacuo yielding 8.5 g (87 percent yield) of a yellow solid product. The product (8.0 g) was recrystallized from $CH_2Cl_2$-t-butyl ethylene to give 7.5 g of a white solid with a melting point of 142–144° C. The following elemental analysis resulted:

Calculated for $C_4N_4S_4Br_2$: C, 12.25; N, 14.29; S, 32.71; Br, 40.76. Found C, 12.62; N, 14.13; S, 32.67; Br, 40.90.

Infrared spectral studies confirmed that the di(3-bromo-1,2,4thiadiazol-5-yl) disulfide was formed.

Example 4—Preparation of 3-Bromo-1,2,4 thiadiazol-5-yl Sulfenyl Chloride

A solution of 8.0 g (0.020 mole) di(3-bromo-1,2,4 thiadiazol-5-yl) disulfide in 150 ml $CH_2Cl_2$ was stirred at $-40°C$, in a a round bottom Pyrex flask while 1.5 g (0.020 mole) $Cl_2$ was added slowly. The reaction mixture remained at ambient temperature for 3 hours before the solvent was evaporated in vacuo yielding 9.5 g (100 percent) of product. Infrared spectral analysis established that 3-bromo-1,2,4 thiadiazol-5-yl sulfenyl chloride was formed.

Example 5—Preparation of 3-Bromo-3'-Chloro-1,2,4 Thiadiazol-5-yl Disulfide

To a slurry of 9.7 g (0.05 mole) dipotassium cyanodithioimidocarbonate in 150 ml $CH_2Cl_2$ stirred at $-40°C$ in a round bottom Pyrex flask a cold solution of bromine chloride was added slowly. The bromine chloride solution, prepared by combining 8.0 g (0.05 mole) $Br_2$ and 3.6 g (0.05 mole) $Cl_2$ at $-45°$ and adding cold $CH_2Cl_2$ after 0.5 hour, was maintained below $-45°$ C during the course of the reaction. The mixture was then allowed to come to room temperature, filtered and the solvent removed in vacuo yielding 8.0 g (92 percent yield) of crude yellow solid which melted at 118°-120°C after one recrystallization (69 percent yield) from methylene chloride-methanol. Elemental analysis was run with results as follows:

Calculated for $C_4N_4S_4BrCl$: C, 13.81; N, 16.14; S, 36.88; Cl, 10.19; Br, 22.98. Found: C, 13.99; N, 16.18; S, 37.22; Cl, 10.04; Br, 23.00.

Infrared analysis provided a spectrum which resembled the superimposed spectra of combined di(3-3-chloro-1,2,4 thiadiazol-5-yl)disulfide and di(3-bromo-1,2,4 thiadiazol-5-yl) disulfide.

Example 6—General Procedure for Sulfenyl Chloride-Olefin Adducts

In a typical experiment 0.1 mole of 3-halo-1,2,4 thiadiazol-5-yl sulfenyl halide was dissolved in 200 ml $CH_2Cl_2$, placed in a round bottom Pyrex flask, 0.1 g $CaCO_3$ added, and the mixture cooled to −50°C. 0.1 mole of olefin was slowly condensed into the solution at a rate such that the solution temperature remained below −20°C. Almost immediately after the addition was completed the solution temperature began to drop and cooling was discontinued. The solvent was then removed at reduced pressure leaving the reaction product which was further purified by distillation at 0.1 mm pressure. The distilled products were subjected to elemental analyses with the results as given in Table I.

then rated on a scale of 0–10 where 0 = no control and 10 = complete control of mycelial growth.

Results

| Fungicide | Dose Rate lbs/acre | Pythium | Rhizoctonia | Sclerotium | Fusarium |
|---|---|---|---|---|---|
| p-dimethyl-aminobenzene diazo sodium sulfonate | 75 | 10.0 | | | |
| | 37 | 9.6 | | | |
| | 18 | 8.8 | | | |
| 1,4-dichloro-2,5 dimethoxy benzene | 400 | | 8.6 | | |
| | 200 | | 7.2 | | |
| | 100 | | 5.2 | | |
| 5-(2-chloroethylthio) 3-chloro-1,2,4 thiadiazole | 50 | 10.0 | 8.0 | 10.0 | 9.0 |
| | 25 | 9.0 | 4.0 | 10.0 | 7.0 |
| | 12.5 | 8.0 | 0.0 | 10.0 | 0.0 |

The thiadiazole derivative was shown to compare favorably with commercial soil fungicides in controlling Pythium and Rhizoctonia. The thiadiazole

TABLE I

| 3-halo-1,2,4 thiadizaol-5-yl sulfenyl halide | Olefin | Yield, percent | | Calculated | | | | Found | | | |
|---|---|---|---|---|---|---|---|---|---|---|---|
| | | Crude | Purified | C | H | N | Cl | C | H | N | C |
| 3-chloro-5 sulfenyl chloride derivative | Ethylene | 97 | 80 | 22.33 | 1.87 | 13.04 | 32.96 | 22.04 | 1.86 | 12.81 | 32.86 |
| Do | Propylene | 100 | 79 | 26.20 | 2.64 | 12.23 | 30.95 | 26.02 | 2.47 | 12.32 | 30.93 |
| Do | Isobutylene | 91 | 71 | 29.63 | 3.32 | 11.52 | 29.16 | 29.72 | 3.21 | 11.67 | |
| 3-bromo-5 sulfenyl chloride derivative | do | 100 | 95 | 25.06 | 2.80 | 9.74 | 12.32 | 24.95 | 2.76 | 9.72 | 12.21 |
| 3-chloro-5 sulfenyl chloride derivative | cis-butene-2 | 91 | 85 | 29.63 | 3.32 | 11.52 | 29.16 | 29.55 | 3.32 | 11.11 | 28.63 |
| Do | Trans-butene-2 | 94 | 81 | 29.63 | 3.32 | 11.52 | 29.16 | 29.82 | 3.27 | 11.73 | 29.49 |
| Do | 3,3-dimethylbutene-1 | 88 | 74 | 35.41 | 4.46 | 10.33 | 26.14 | 34.70 | 4.14 | 10.60 | 26.27 |
| Do | Butadiene | 96 | | 29.88 | 2.51 | 11.62 | 29.40 | 29.75 | 2.63 | 11.80 | 29.53 |
| Do | 2-methylbutene-2 | 98 | 76 | 32.69 | 3.91 | 10.91 | | 32.35 | 3.72 | 10.96 | |
| Do | Allyl chloride | 102.5 | | | | | | | | | |

As can be noted from Table I, all olefin reaction products were obtained in good yield. The elemental analyses indicate that the desired products were formed.

Example 7—Reaction of 5-(2-chloroethylthio) 3-chloro-1,2,4 thiadiazole and ammonium diethyldithiophosphate 0.030 Mole of 5-(2-chloroethylthio) 3-chloro-1,2,4 thiadiazole and 0.033 mole of ammonium diethyldithiophosphate was dissolved in 40 ml of acetonitrile and then placed in a round bottom Pyrex flask. 5 g of NaCl dissolved in 6 ml of water were added to the solution with agitation. Agitation, at room temperature, was continued until the reaction was essentially complete. The crude reaction product was separated by extraction with a water-ether mixture.

Example 8—Evaluation of 5-(2-chloroethylthio) 3-chloro-1,2,4 thiadiazole as a soil fungicide The above thiadiazole derivative was evaluated and compared to typical commercial soil fungicides. The following procedure was used.

Separate lots of sterilized soil were inoculated with Pythium, Rhizoctonia, Sclerotium and Fusarium. The inoculated soil was placed in 4 oz. dixie cups and drenched with 20 ml of a formulation containing sufficient chemical to give the required dose rate in the soil. The treated cups were incubated for 2 days at 70°F. The amount of mycelial growth on the soil surface was derivative also shows activity in the control of Sclerotium and Fusarium.

Example 9—1,2,4-Thiadiazol-3,5,-yl bis sulfenyl chloride 113 g dipotassium salt of 3,5 dimercapto-1,2,4 thiadiazole in 900 ml $CH_2Cl_2$ was cooled to −50°C with stirring and 71 g of chlorine slowly added. The mixture was allowed to come to ambient temperature, the KCl filtered off, and the solvent removed by distillation under vacuum. The resulting product is the disulfenyl derivative indicated above. The elemental analysis was as follows:

Calculated for $C_2N_2S_3Cl_2$: C, 10.96; N, 12.78. Found: C, 11.29; N, 12.87.

This product reacts with olefins in a manner similar to the reaction of the 3-halo-1,2,4 thiadiazol-5-yl sulfenyl halides, except that olefin addition takes place at b both sulfenyl halide groups. Novel di-(chlorohydrocarbylthio) 1,2,4 thiadiazoles can be synthesized with this procedure. These products would also be expected to show utility as pesticides, antioxidants, and lubricating oil additives.

The bis sulfenyl chloride-olefin adduct was prepared by reacting ethylene with 1,2,4-thiadiazol-3,5-yl bis sulfenyl chloride and separating the products in accordance with the procedure given in Example 6, except that 0.2 mole of ethylene was added per 0.1 mole of the bis sulfenyl chloride. Elemental analysis indicated that the diolefin adduct was formed.

Calculated for $C_6H_8N_2S_3Cl_2$: C, 26.18; H, 2.93; N, 10.17; S, 34.95; and Cl, 25.76.

Found: C, 25.71; H, 2.70; N, 10.69; S, 34.50; and Cl, 27.66.

The above invention is not intended to be restricted to the above examples since many modifications within the scope of this invention will be apparent to those skilled in the art.

What is claimed is:

1. 3-Halo-1,2,4 thiadiazol-5-yl sulfenyl halide having the formula

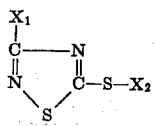

wherein $X_1$ and $X_2$ are independently chosen from the group consisting of F, Cl, Br and I.

2. The compound of claim 1 in which $X_1$ and $X_2$ are Cl.

3. The compound of claim 1 in which $X_1$ and $X_2$ are Br.

4. The compound of claim 1 in which $X_1$ is Br and $X_2$ is chlorine.

5. A process for preparation of 3-chloro-1,2,4-thiadiazol-5-yl sulfenyl chloride which comprises contacting a cyanodithioimidocarbonate salt, said salt being selected from the group consisting of Groups IA, IIA and IIIA salts, with a chlorinating compound, said chlorinating compound selected from the group consisting of $Cl_2$, sulfuryl chloride and thionyl chloride, in an inert solvent at a temperature of from $-100°$ to $+100°C$.

6. The process of claim 5 wherein the salt is dipotassium cyanodithioimidocarbonate.

7. The process of claim 6 wherein the chlorinating compound is $Cl_2$.

8. The process of claim 6 wherein the reaction is carried out in an inert solvent, said solvent being selected from the group consisting of hydrocarbyl ethers and chlorinated solvents.

9. The process of claim 9 wherein the temperature range of the reaction is from $-50°$ to $0°C$.

10. The process of claim 10 wherein the solvent is methylene chloride.

11. The process of claim 5 wherein said salt is selected from the group consisting of sodium and potassium salts.

12. A process for the preparation of 3-halo-1,2,4-thiadiazol-5-yl sulfenyl chloride, said halo being selected from the group consisting of chloro and bromo which comprises contacting a cyanodithioimidocarbonate salt, said salt being selected from the group consisting of Groups IA, IIA and IIIA salts, with a halogenating compound selected from the group consisting of $Br_2$ and BrCl in an inert solvent at a temperature of from $-100°$ to $+100°C$ to form a 3-halo-1,2,4-thiadiazol-5-yl disulfide, and contacting said disulfide in an inert solvent at a temperature of from $-100°$ to $+100°C$, with a chlorinating agent selected from the group consisting of $Cl_2$, sulfuryl chloride and thionyl chloride.

13. The process of claim 12 wherein said salt is selected from the group consisting of potassium and sodium salts.

14. The process of claim 13 wherein said chlorinating agent is $Cl_2$.

15. The process of claim 14 wherein said halo is bromo and said halogenating compound is $Br_2$.

16. The process of claim 14 wherein said halo is bromo and said halogenating compound is BrCl.

17. The process of claim 14 wherein said halo is chloro and said halogenating compound is BrCl.

* * * * *